(12) United States Patent
Shlomot

(10) Patent No.: US 12,299,213 B2
(45) Date of Patent: **\*May 13, 2025**

(54) ACTIVATING A HANDHELD DEVICE WITH UNIVERSAL POINTING AND INTERACTING DEVICE

(71) Applicant: Eyal Shlomot, Long Beach, CA (US)

(72) Inventor: Eyal Shlomot, Long Beach, CA (US)

( * ) Notice: Subject to any disclaimer, the term of this patent is extended or adjusted under 35 U.S.C. 154(b) by 157 days.

This patent is subject to a terminal disclaimer.

(21) Appl. No.: 18/211,313

(22) Filed: Jun. 19, 2023

(65) Prior Publication Data

US 2023/0384871 A1    Nov. 30, 2023

Related U.S. Application Data

(63) Continuation-in-part of application No. 17/524,769, filed on Nov. 12, 2021, now abandoned.

(51) Int. Cl.
| | | |
|---|---|---|
| G06F 3/03 | (2006.01) | |
| G06F 3/0346 | (2013.01) | |
| G06F 3/038 | (2013.01) | |
| G06T 7/70 | (2017.01) | |
| G06F 3/0354 | (2013.01) | |

(52) U.S. Cl.
CPC .......... G06F 3/0346 (2013.01); G06F 3/0304 (2013.01); G06F 3/038 (2013.01); G06T 7/70 (2017.01); *G06F 3/03545* (2013.01)

(58) Field of Classification Search
CPC ........ G06F 3/03; G06F 3/0346; G06F 3/0304; G06F 3/038; G06F 3/03545; G06F 2203/0383; G06F 3/016; G06F 3/011; G06T 7/70; G09B 21/003; G09B 21/008; G09B 21/006; G06V 40/12
See application file for complete search history.

(56) References Cited

U.S. PATENT DOCUMENTS

| | | | |
|---|---|---|---|
| 8,810,599 B1 * | 8/2014 | Tseng | G05D 1/0246 340/8.1 |
| 11,334,174 B2 * | 5/2022 | Shlomot | G06F 3/011 |
| 2012/0086725 A1 * | 4/2012 | Joseph | G06F 3/0346 345/157 |
| 2012/0127110 A1 * | 5/2012 | Amm | G06F 3/03545 345/174 |
| 2015/0193005 A1 * | 7/2015 | Di Censo | G06F 9/453 |
| 2018/0136745 A1 * | 5/2018 | Li | G06T 1/20 |

* cited by examiner

*Primary Examiner* — Lunyi Lao
*Assistant Examiner* — Jarurat Suteerawongsa

(57) ABSTRACT

This invention describes a universal pointing and interacting (UPI) device that is configured to interact with a handheld device such as a smartphone or a tablet. The interaction means activating the screen of the handheld device based on the relative spatial relations between the UPI device and the handheld device. In addition, the interaction means activating other elements, such as audio playing, vibration motors and others, on either the handheld device or the UPI device. The relative spatial relations between the UPI device and the handheld device are estimated using a camera, an accelerometer, a magnetometer or a LIDAR on the handheld device, as well as by using a camera, an accelerometer, a magnetometer or a LIDAR on the UPI device.

19 Claims, 10 Drawing Sheets

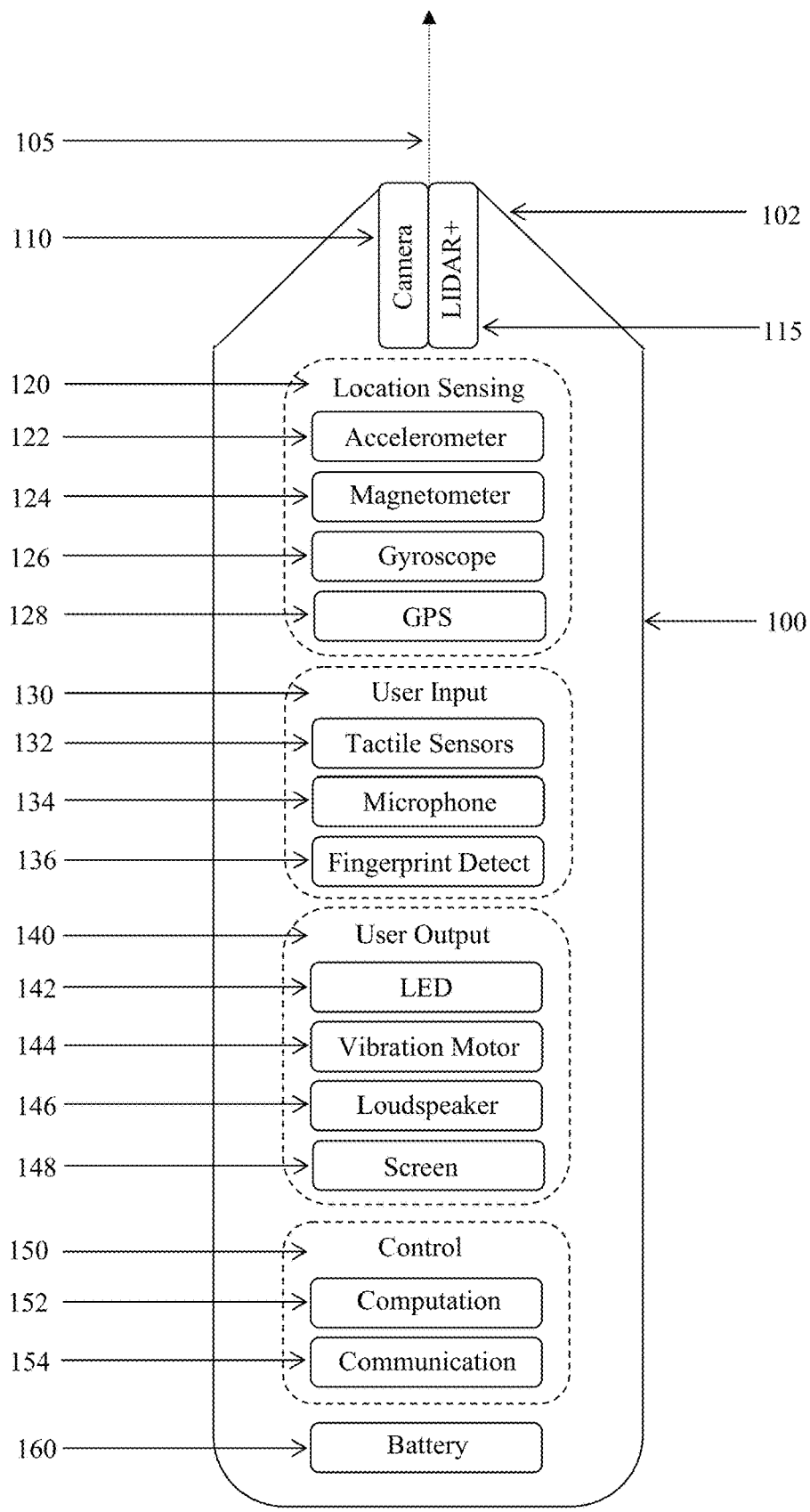
Figure 1A – A Schematic Diagram of a Full and Independent UPI Device

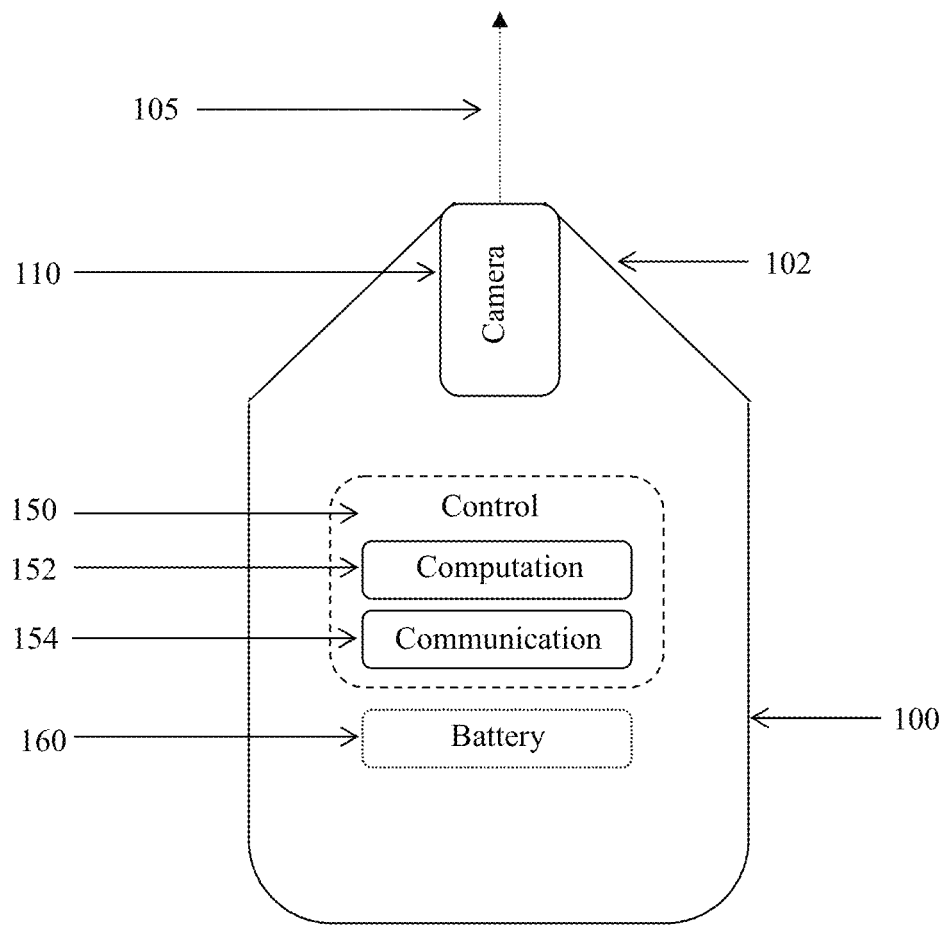
Figure 1B – A Schematic Diagram of Simplified UPI Device

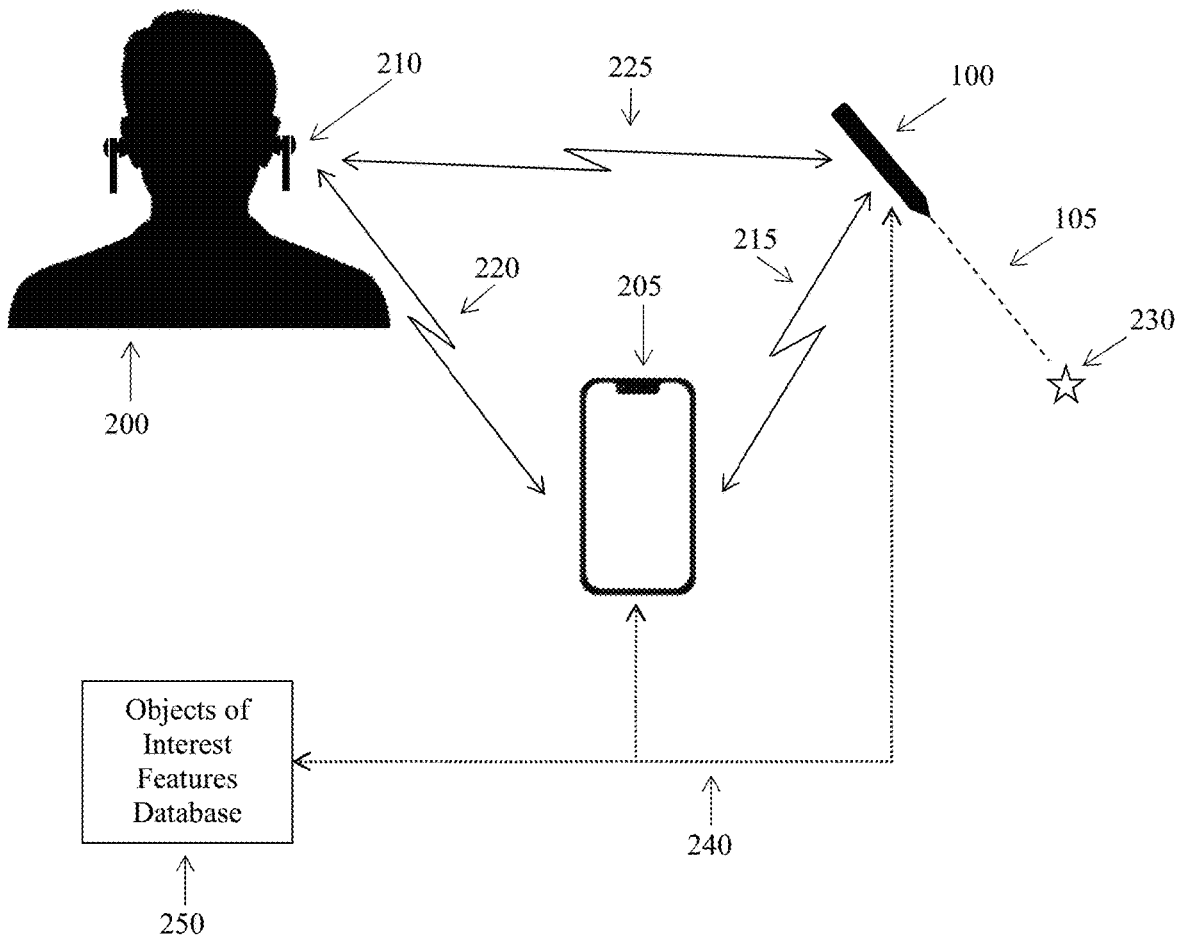
Figure 2A – A Schematic Diagram of an Operational Configuration for a UPI Device

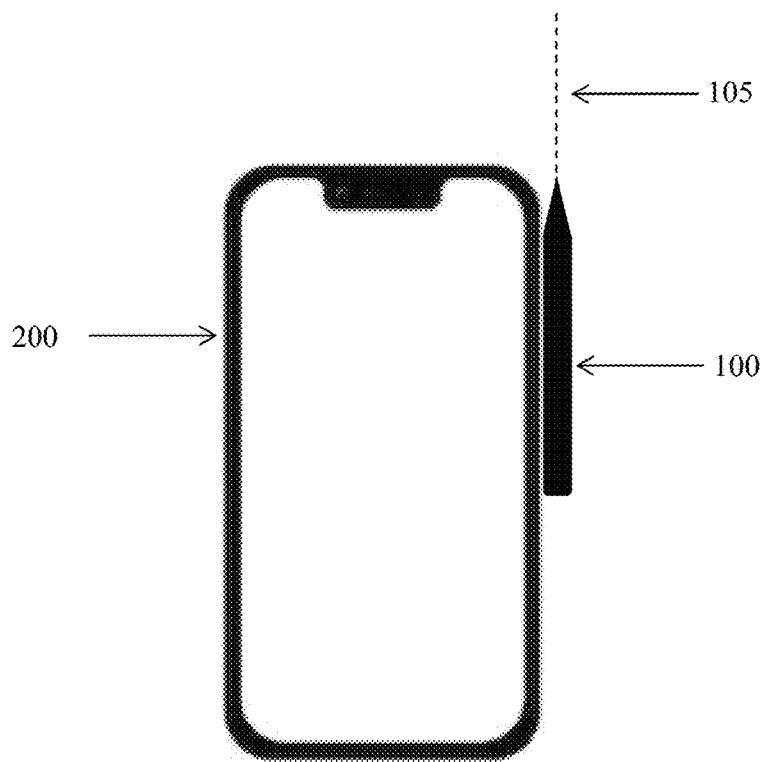
Figure 2B – Partial Schematic Diagram of an Operational Configuration for a Simplified UPI Device

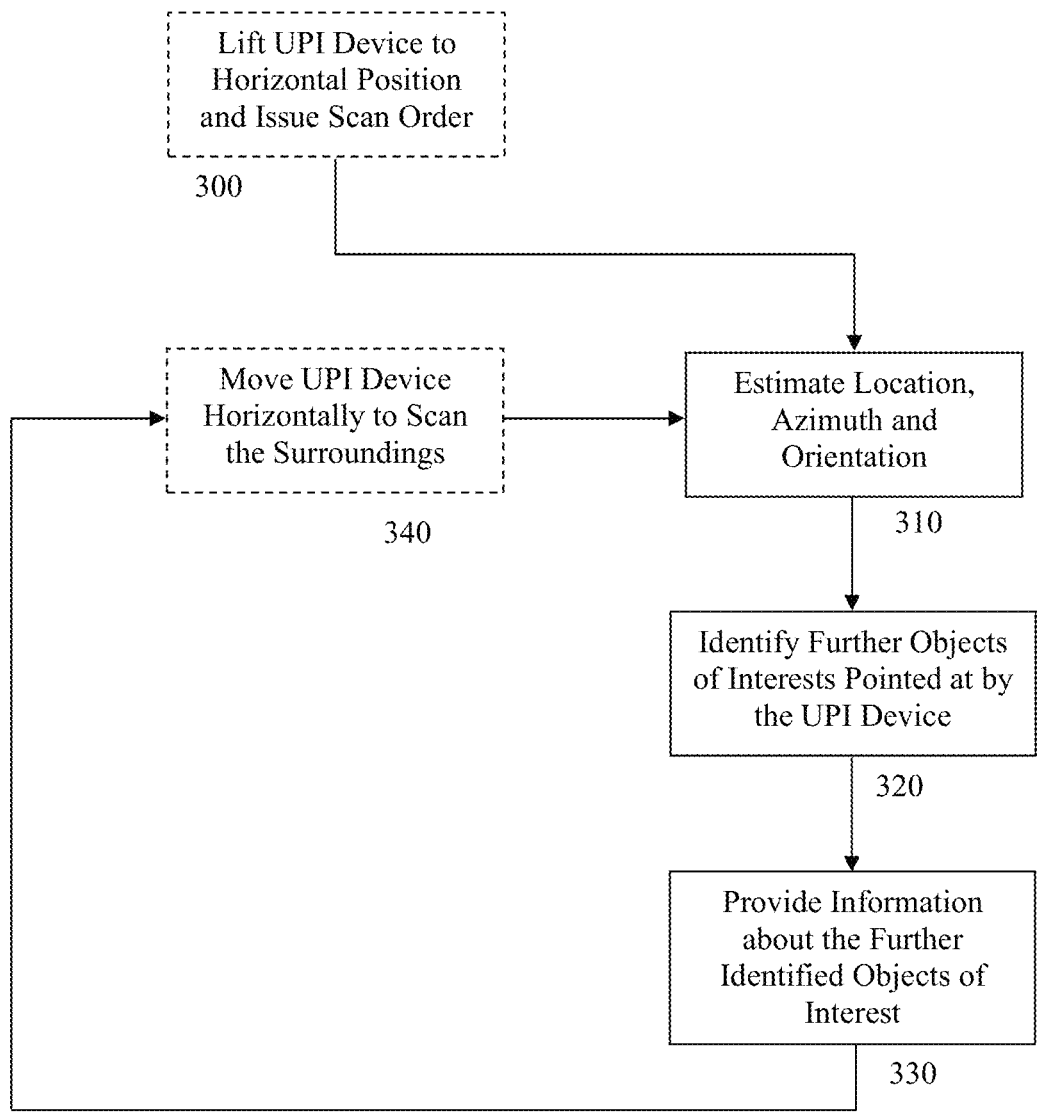
Figure 3 – A Schematic Flowchart of a Scanning Procedure, with User Actions on the Left and UPI Device Actions on the Right

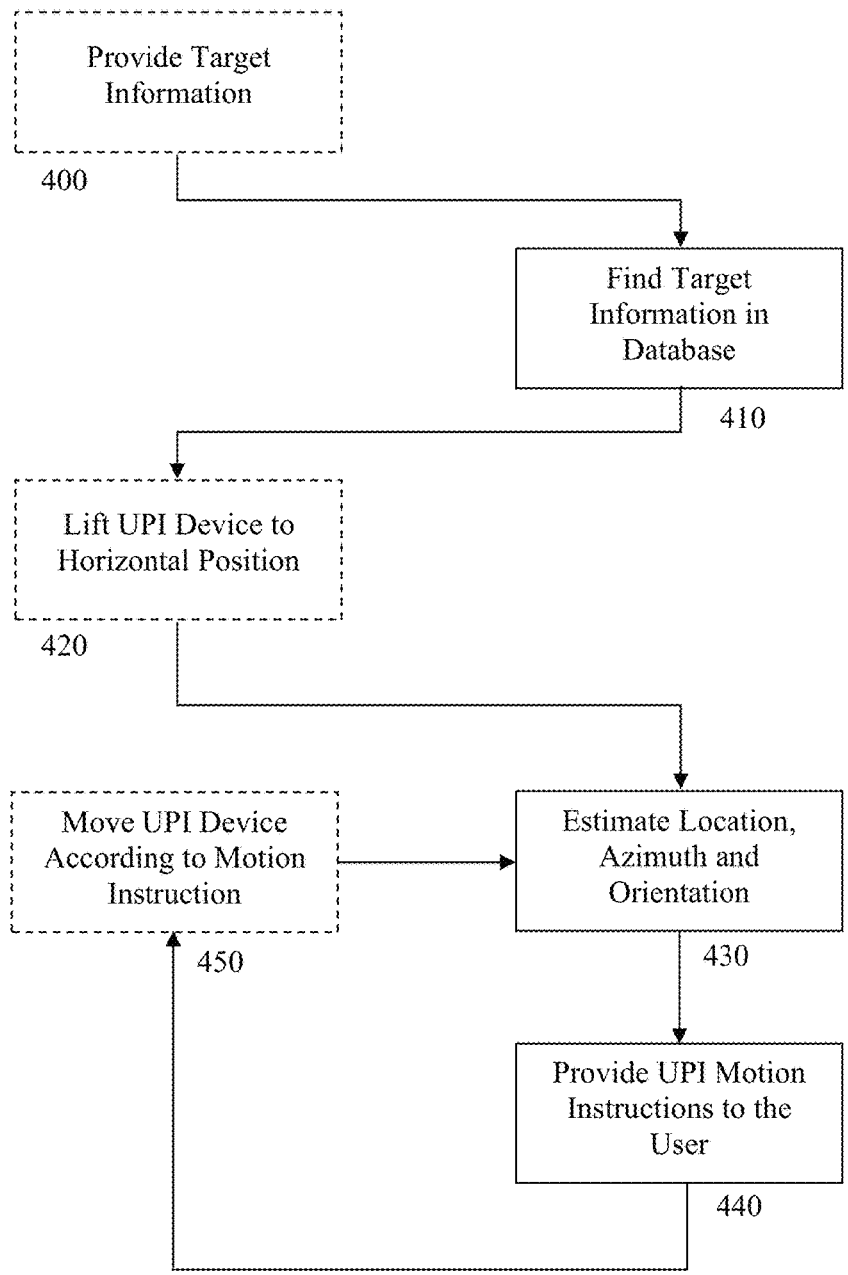
Figure 4 – A Schematic Flowchart of a Locating Procedure, with User Actions on the Left and UPI Device Actions on the Right

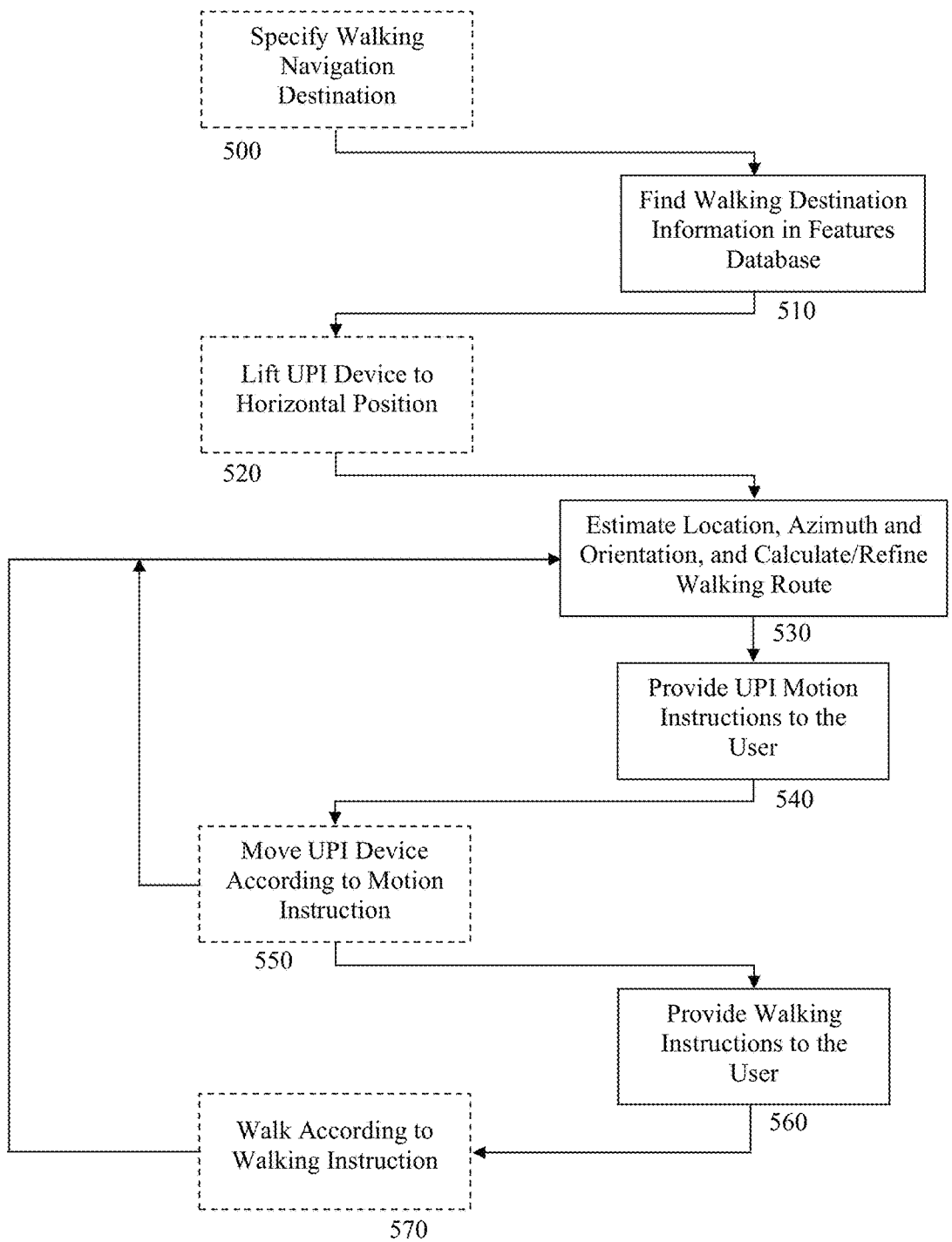
Figure 5 – A Schematic Flowchart of a Navigating Procedure, with User Actions on the Left and UPI Device Actions on the Right

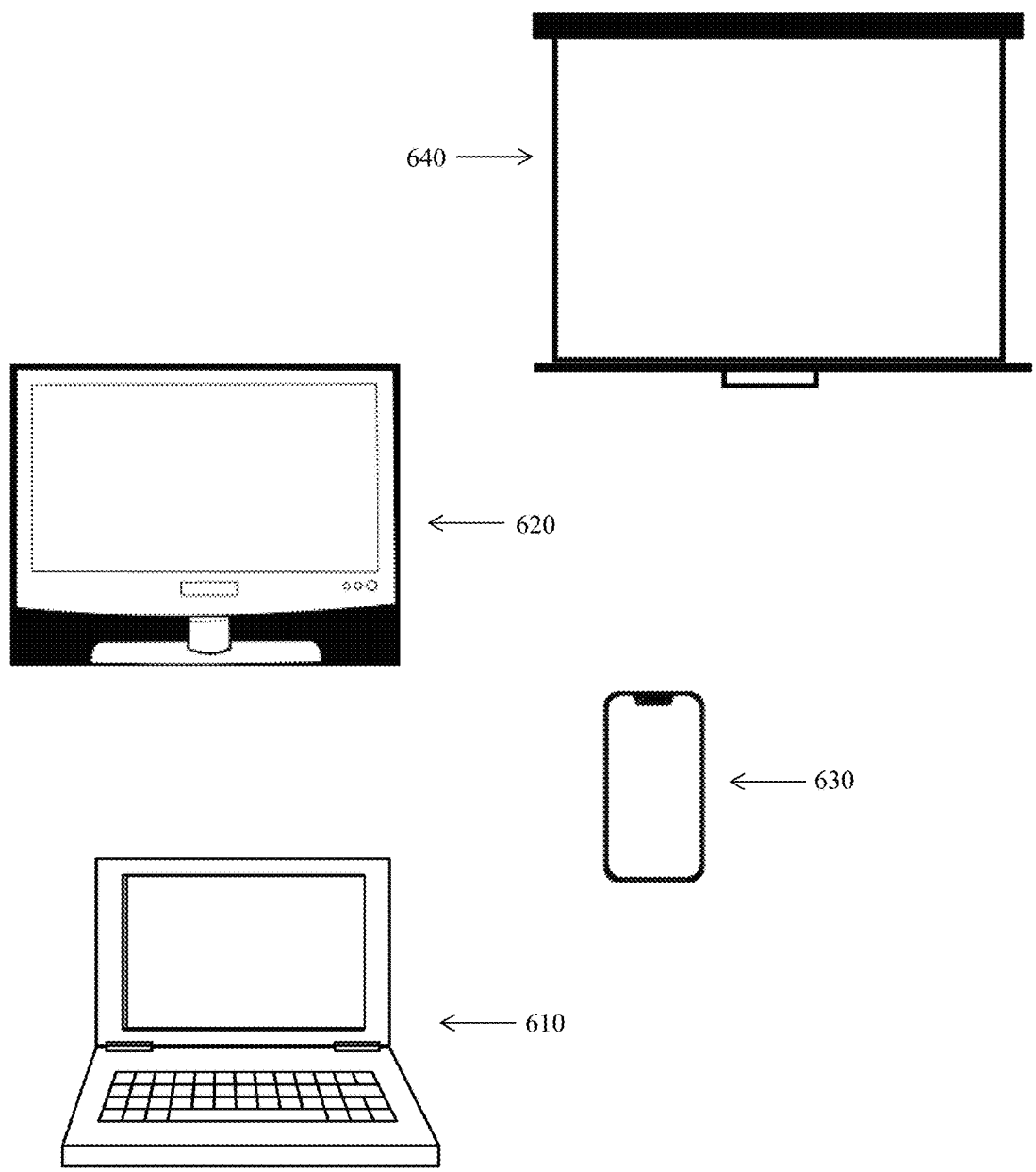
Figure 6 – A Schematic Diagram of Examples of Screens Pointed at and Activated by a UPI Device

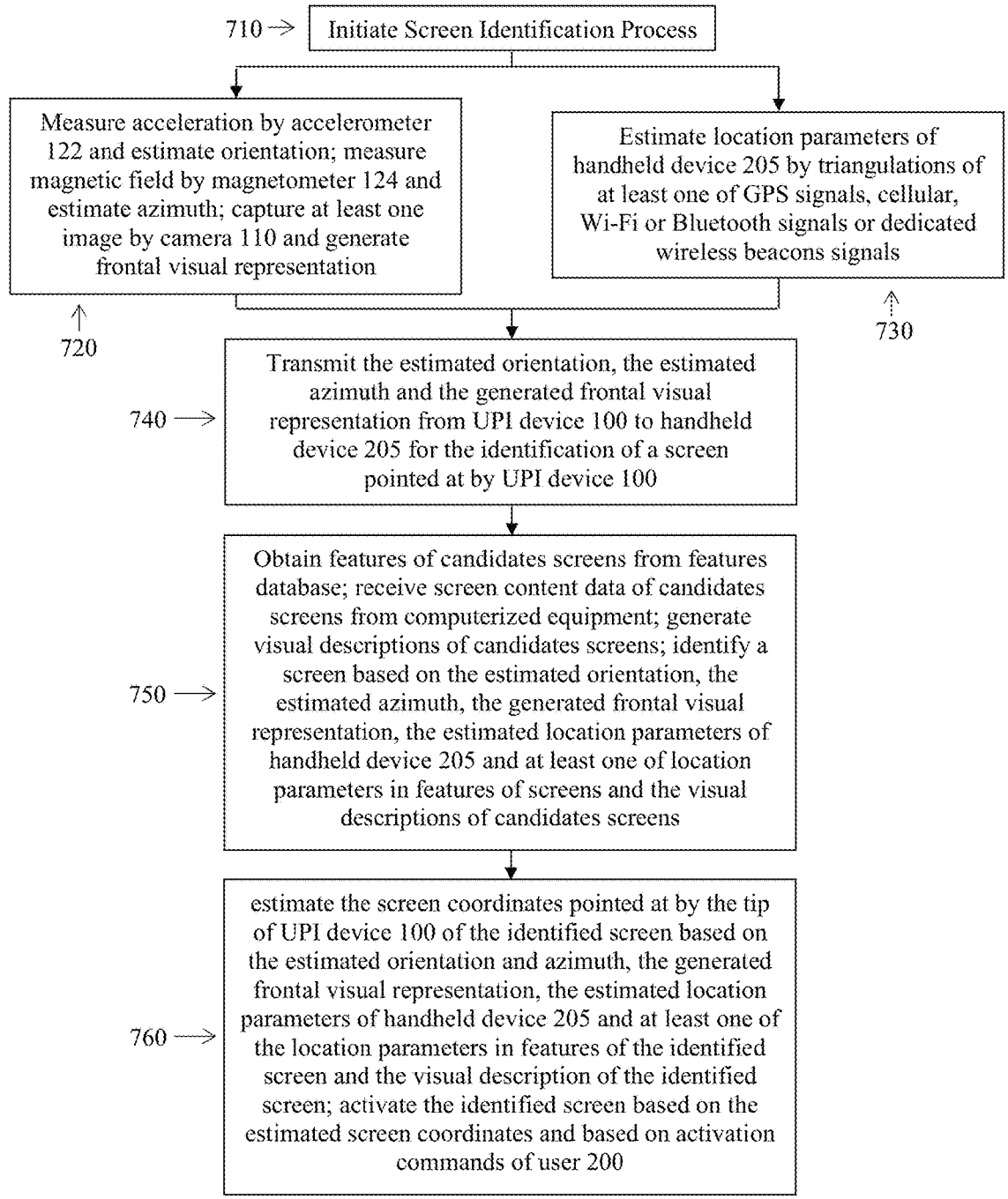
Figure 7 – A Schematic Diagram of the Operation of a UPI Device in Pointing and Activating Screens

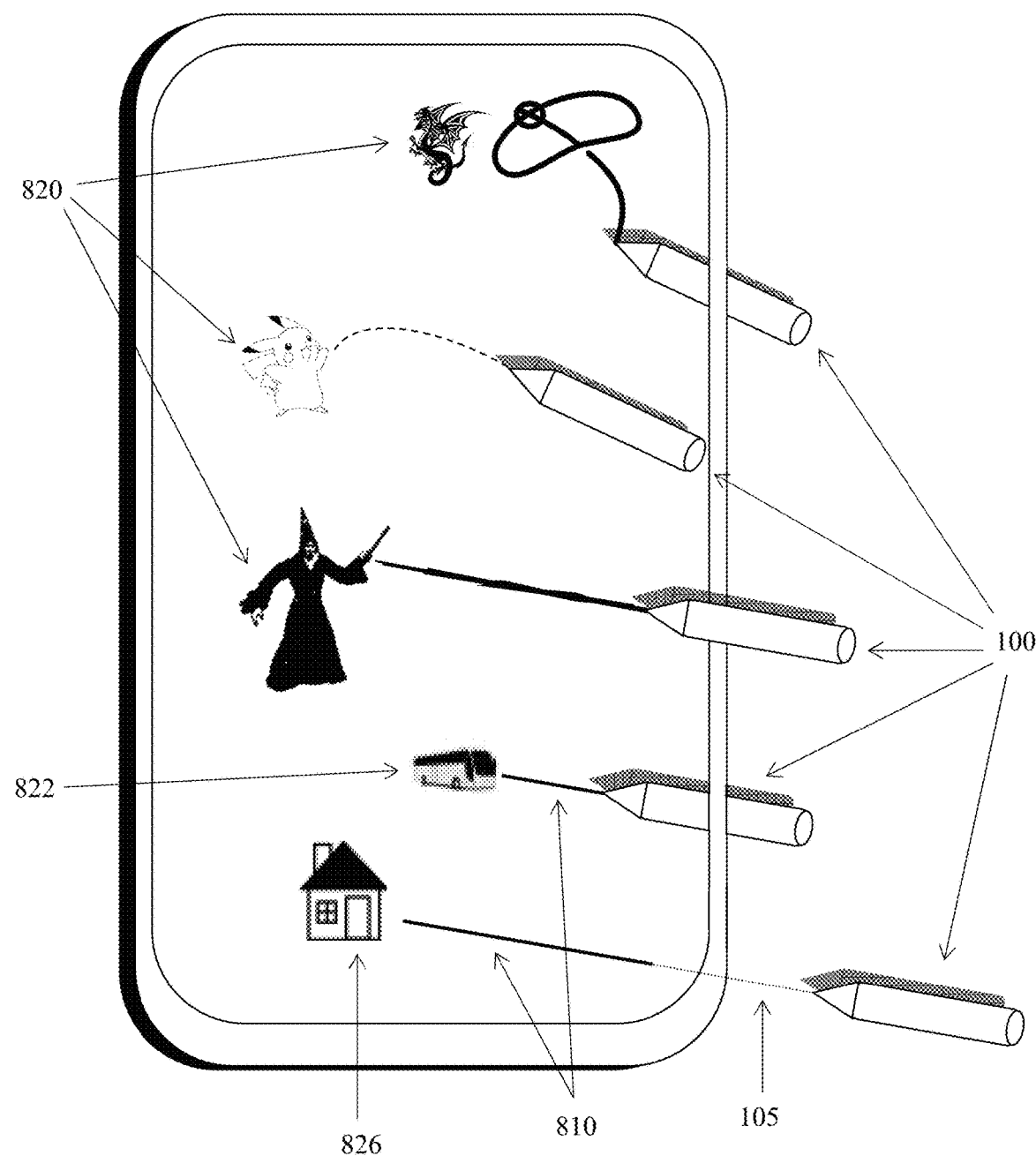
Figure 8 – A Schematic Diagram of Examples of Interaction by UPI Device with Real and Virtual Objects on a Screen of a Handheld Device

ACTIVATING A HANDHELD DEVICE WITH UNIVERSAL POINTING AND INTERACTING DEVICE

CROSS-REFERENCE TO RELATED APPLICATIONS

This application is a Continuation-In-Part of U.S. patent application Ser. No. 17/524,769 filled on Nov. 12, 2021, which is hereby incorporated by reference in its entirety. This application claims priority benefits of U.S. patent application Ser. No. 16/931,391 filled on Jul. 16, 2020, which is hereby incorporated by reference in its entirety. This application also claims priority benefits of U.S. provisional patent application Ser. No. 62/875,525 filed on Jul. 18, 2019, which is hereby incorporated by reference in its entirety. This application also claims priority benefits of U.S. provisional patent application Ser. No. 63/113,878 filed on Nov. 15, 2020, which is hereby incorporated by reference in its entirety. This application also claims priority benefits of U.S. provisional patent application Ser. No. 63/239,923 filed on Sep. 1, 2021, which is hereby incorporated by reference in its entirety.

FIELD OF THE INVENTION

The present invention relates to a simple and practical universal pointing and interacting (UPI) device that can be used for interacting with objects in the surroundings of the user of the UPI device. In particular, the present invention describes operating of screens with a UPI device.

BACKGROUND ART

Advances in processing and sensing technologies enable users of electronic devices to receive information about and to interact with objects in their surroundings. Applications for navigation, ride-sharing, public-transportation, commerce or similar applications on handheld devices (e.g., smart-phones or tablets) make use of the location coordinates (longitude, latitude and altitude) of the users and are ubiquitous in everyday lives. Simplified augmented reality (AR) applications on handheld devices make use of the location parameters, such as the location coordinates, the azimuth and the orientation (pitch and roll) of the handheld devices to interact with the surroundings, such as Live View navigation that superimposes information tags on images of the surroundings captured by the camera of a handheld device, or star-gazing applications that allow the user to point and identify heavenly bodies and to receive information about such bodies via the camera and the screen of a handheld device. Full scale AR systems, civilian and military, commonly use the location parameters of head-mounted displays (HMD) for user interaction with objects of interest in the surroundings, such as receiving information about or activating objects pointed at by the user's line-of-sight or by handheld control units. The core technology for the estimation of the location coordinates is satellite navigation, such as GPS, that estimates the longitude, latitude and altitude by triangulations of satellite signals (the acronym GPS is used throughout this disclosure to represent any global navigation system). The azimuth is estimated by a magnetometer that measures the earth magnetic field and the orientation (pitch and roll) is estimated by an accelerometer that measures the earth gravity vector. The accuracy of the estimation of the location parameters may improve in urban and indoor environments by triangulating wireless signals such as cellular, Wi-Fi, Bluetooth, or dedicated radio-beacons. Further accuracy in the estimation of the location parameters may be achieved by analyzing images of the surroundings taken by the camera of a handheld device for the detection of objects of interest with known pictorial representations and known locations. Once such objects of interest are detected, their known locations and the positions they appear in the camera field-of-view may be used for very accurate triangulations to establish the location parameters of the handheld device. This approach became feasible in recent years as visual descriptions and location parameters data of vast numbers of topographical, urban and commercial objects of interest are now available in accessible databases, as the result of extensive photographic and geographic surveys that were carried out at all corners of the world during the last decade.

The following US patents and patent applications disclose several background art aspects that are relevant to this invention, such as approaches of location parameters estimation, motion detection, styluses and wands, pointing and activating devices and AR systems, image assisted orientation and navigation, as wells as other aspects. U.S. Pat. Nos. 6,897,854, 7,596,767, 8,179,563, 8,239,130, 8,467,674, 8,577,604, 8,681,178, 8,698,843, 8,810,599, 8,878,775, 9,140,555, 9,195,872, 9,201,568, 9,224,064, 9,229,540, 9,280,272, 9,303,999, 9,329,703, 9,400,570, 9,429,434, 9,519,361, 9,639,178, 9,678,102, 9,696,428, 9,870,119, 10,028,089, 10,198,649, 10,198,874, 10,240,932, 10,274,346, 10,275,047, 10,275,051, 10,318,034, 10,324,601, 10,328,342, 10,365,732, 10,444,834, 10,488,950, 10,565,724, 10,592,010, and US patent applications 2018/0173397, 2019/0369754, 2020/0103963.

Immersive AR systems that use HMD may be able to provide a full AR experience, including the interaction with real and virtual objects in the environment, but are expensive, difficult to operate and were not yet shown to attract significant commercial attention. Simplified AR applications on handheld devices may have wider commercial penetration, but are quite uncomfortable and awkward to operate, as pointing at objects of interest is not intuitive and as the screen of a handheld device is used for both viewing the surroundings and entering user commands to interact with objects of interest in the surroundings. Moreover, simplified AR navigation applications on handheld devices can pose a danger to the user who holds the handheld device at eye level, causing significant distraction from the immediate surroundings. Therefore, there is a need for a cheap and simple device that can provide comfortable and intuitive pointing and interacting capabilities with objects of interest in the user's surroundings.

BRIEF DESCRIPTION OF THE INVENTION

The present invention is directed to a universal pointing and interacting (UPI) device that is configured to interact with objects of interest, where interacting means identifying objects of interest pointed at by the UPI device and at least one of providing information about such objects and activating such objects by the user of the UPI device. Objects of interest are geographical, topographical, urban, commercial and other types of objects in the surroundings that their features are readily tabulated in vast and accessible features databases. The features of the objects of interest are at least the location parameters of the objects of interest, but for most objects of interest the features may include visual descriptions of the objects of interest, such as the objects of interest pictorial representation or structural data. The features of the objects of interest may also include any additional useful information about such objects. The term "features database" is used throughout this disclosure to denote any publicly or privately available database that may be used to retrieve theses features of the objects of interest. Objects of interest may also be moving objects, such as public transportation vehicles, that estimate their location coordinates and that make their location coordinates available over the Internet or other networks. Objects of interest may also by virtual objects that are generated with known locations in the surroundings of the user of the UPI device. A particular type of objects of interest are display screens, where the UPI device may be used to control such screens, similar to a mouse, remote control or stylus.

BRIEF DESCRIPTION OF THE DRAWINGS

The features and advantages of the present invention will become more readily apparent to those ordinarily skilled in the art after reviewing the following detailed description and accompanying drawings, wherein:

FIG. 1A is a schematic diagram schematic diagram of a full and independent UPI device.

FIG. 1B is a schematic diagram schematic diagram of a simplified UPI Device.

FIG. 2A is a schematic diagram an operational configuration for a UPI device.

FIG. 2B is a schematic diagram of an operational configuration for a simplified UPI device.

FIG. 3 is a schematic flowchart of a scanning procedure, with user actions on the left and UPI device actions on the right.

FIG. 4 is a schematic flowchart of a locating procedure, with user actions on the left and UPI device actions on the right.

FIG. 5 is a schematic flowchart of a navigating procedure, with user actions on the left and UPI device actions on the right.

FIG. 6 is a schematic diagram of examples of screens pointed at and activated by a UPI device.

FIG. 7 is a schematic diagram of the operation of a UPI device in pointing and activating screens.

FIG. 8 is a schematic diagram of examples of interaction by UPI device with real and virtual objects on a screen of a handheld device.

DETAILED DESCRIPTION OF THE INVENTION

FIG. 1A describes a full and independent universal pointing and interacting (UPI) device 100. The components of UPI device 100 in FIG. 1A correspond to the components of the UPI device described in FIG. 1 of U.S. patent application Ser. No. 16/931,391. Such UPI device 100 comprises of an elongated body similar to a wand or a stylus. Tip 102 of UPI device 100 is the frontal end of the longest dimension of the elongated body of UPI device 100 and the main axis of UPI device 100 is the axis of longest dimension of the elongated body of UPI device 100. Pointing ray 105 is an indefinite extension of the main axis of UPI device 100 in the frontal direction from tip 102 of UPI device 100. Camera 110 and LIDAR+ 115 are positioned at tip 102 of UPI device 100. LIDAR+ 115 is any type of LIDAR device, single-beam or multi-beam, or it can be any other distance measuring device that may be based on other technologies, such as ultrasound or radar. UPI device 100 may also be of any shape, other than an elongated body, that is suitable to be held by hand, clipped on eyeglasses frames, strapped to the user head (e.g., attached to a hat, visor or headband), attached to any part of the user body, or shaped as part of a ring, where the frontal direction of UPI device 100 that forms pointing ray 105 is the direction the camera of UPI device 100 is facing. UPI device 100 further includes location sensing components 120, user input components 130, user output components 140, control components 150, and battery 160. Location sensing components 120 includes accelerometer 122, magnetometer 124 and gyroscope 126, as well as GPS 128. User input components 130 includes tactile sensors 132 (e.g., switches, slides, dials or other touch sensors), microphone 134 and fingerprint detection sensor 136. User output components 140 includes light emitting diode (LED) 142, vibration motor 144, loudspeaker 146 and screen 148. Control components 150 includes computation component 152 and communication component 154.

Input components 130 and output components 140 facilitate the user interaction with UPI device 100. Specifically, if UPI device 100 is designed to be held by a hand, it may have one side that is mostly used facing up and an opposite side that is mostly used facing down. Tactile sensors 132 and fingerprint detection sensor 136 are placed on the outer shell of UPI device 100 in suitable locations that are easily reachable by the fingers of the user, for example, at the "down" side. LED 142 (or several LEDs) are also placed on the outer shell of UPI device 100 in suitable locations to be seen by the user, for example, at the "up" side. Screen 148 may also be placed on the outer shell of UPI device 100 at the "up" side. Vibration motor 144 is placed inside UPI device 100, preferably close to the area of UPI device 100 where the user is holding the device. Moreover, two units of vibration motor 144 may be used, each placed in each edge of UPI device 100, which can be used to create rich vibration patterns for the user of UPI device 100. Microphone 134 and loudspeaker 146 are placed for optimal receiving of audio and playing of audio from/to the user, respectively.

As was discussed in U.S. patent application Ser. No. 16/931,391, UPI device 100 depicted in FIG. 1A can operate as an independent device. However, as UPI device 100 is more likely to operate together with a handheld device, such as a cellphone or a tablet, some of the components of UPI device 100 are not essential. For example, GPS 128 may not be essential, as the general location of UPI device 100 may be obtained from the location information of the handheld device if UPI device 100 is operating together with that handheld device. FIG. 1B describes a simplified option for the structure of UPI device 100, which includes the key elements of camera 110 and control components 150 that transmit the images captured by camera 110 to the handheld device. Even battery 160 may be eliminated if UPI device 100 is connected by a cable to the handheld device. UPI device 100 can have any configuration between the full and independent configuration depicted in FIG. 1A and the simplified configuration depicted in FIG. 1B. Obviously, in any configuration that is not the full and independent configuration depicted in FIG. 1A, UPI device 100 will be operating together with a handheld device and therefore the description of the operation of UPI device 100 may also be considered as a description of the operation of UPI device 100 that is operating together with that handheld device, as discussed below.

FIG. 2A shows an optional operational configuration for UPI device 100 where user 200 of UPI device 100 also uses handheld device 205 (e.g., smart-phone, tablet, etc.) and optionally also earbuds 210 that may include a microphone. Wireless connections 215, 220 and 225 connect UPI device 100, handheld device 205 and earbuds 210, based on the desired configuration, and are commonly Bluetooth or Wi-Fi connections, but any other wireless or wireline connection protocol may be used. Wireless connections 215, 220 and 225 enable the shared operation of UPI device 100 together with handheld device 205 and earbuds 210. One element of the shared operation is the user interaction, by receiving inputs from user 200 by input elements on handheld device 205 or earbuds 210 (in addition to receiving inputs by user input components 130 on UPI device 100) and by providing outputs to user 200 by output elements on handheld device 205 or earbuds 210 (in addition to providing outputs by user output components 140 on UPI device 100). Another element of the shared operation is the sharing of measurements, such as using the GPS information of handheld device 205 for the operation of UPI device 100, while yet another element is the sharing of the computation loads between UPI device 100 and handheld device 205. Communication link 240 provides the means for UPI device 100 or handheld device 205 to connect with features database 250 that holds the features of objects of interest 230, where the features are the location information of objects of interest 230, visual description of objects of interest 230, as well as other information about objects of interest 230 (e.g., opening hours and a menu if a particular object of interest 230 is a restaurant). Wireless connections 215, 220 and 225 depicted in FIG. 2A may be implemented using a wire connection, as earbuds 210 may be replaced with headphones connected by a wire to handheld device 205 or a wire may be used to connect between UPI device 100 and handheld device 205.

U.S. patent application Ser. No. 16/931,391 describes the identification of objects of interest 230 that are pointed at by UPI device 100, such that information about these objects is provided to the user. This identification of objects of interest 230 and providing that information is also critical for the blind or visually impaired, but additional operating procedures of UPI device 100 for the blind or visually impaired are the scanning of the surroundings, the locating of targets in the surroundings, as well as the navigating in the surroundings to a specific destination. To perform these operating procedures, it is critical to know the exact location of the UPI device 100 and its exact pointing direction, i.e., its azimuth and orientation. Current navigation devices (or apps on handheld devices) mainly use the GPS location information, but the error in the GPS location information is a few meters in typical situations and the error can be significantly larger in a dense urban environment. Current navigation devices may use a magnetometer to estimate the azimuth, but a typical magnetometer error is about 5° and the error can be significantly larger when the magnetometer is near iron objects. Obviously, these accuracies are insufficient for the guidance of the blind or visually impaired uses.

The discussion of the operation of UPI device 100 in U.S. patent application Ser. No. 16/931,391 includes the description of a procedure that finds the exact location, azimuth and orientation of UPI device 100 by capturing images by camera 110. This procedure includes identifying several objects of interest 230 in the surroundings that their locations and visual descriptions are known and tabulated in features database 250 and obtaining highly accurate estimation of the location, azimuth and orientation of UPI device 100 by triangulation from the known locations of these identified objects of interest 230. This visual positioning procedure is identical to currently available commercial software, and specifically to the Visual Positioning Service/System (VPS) developed by Google. To avoid confusion and to align this patent application with currently published technical literature, it is important to emphasis that objects of interest 230 in U.S. patent application Ser. No. 16/931, 391 comprise of two types of objects. One type of objects of interest 230 are objects that are needed for the visual position procedure, which are of very small dimension (e.g., a specific window corner) and are usually called "reference points" in the literature. The features of these reference points that are stored in features database 250 include mostly their locations and their visual description. Other type of objects of interest 230 are in general larger objects (e.g., a commercial building) and their features that are stored in features database 250 may include much richer information (e.g., commercial businesses inside building, opening hours, etc.).

In general terms, there are 3 procedures that are performed by a seeing person for orientation and navigation in the surroundings. The first procedure is "scanning", which is performed when a person arrives to a new location, which happens, for example, when a person turns a street corner, exits a building or disembarks a vehicle. The second procedure is "locating", which is performed when a person is interested in locating a particular object or landmark in the surroundings, such as a street address, an ATM or a bus stop. The third procedure is "navigating", which is the controlled walking from a starting point to a destination end point. To perform these procedures, a seeing person is using visual information to determine the person location and orientation. Obviously, a seeing person seamlessly and interchangeably uses these 3 procedures in everyday activities. We will describe how a blind or visually impaired person can use UPI device 100 to perform each of these procedures.

The scanning procedure is performed by holding UPI device 100 and moving it along an approximated horizontal arc that covers a sector of the surroundings. As UPI device 100 is estimating its location and as it is moved along an approximated horizontal arc its azimuth and orientation are continuously updated and therefore it can identify objects of interest 230 in its forward direction as it is moved. UPI device 100 can provide audio descriptions to the user about objects of interest 230 at the time they are pointed at by UPI device 100 (or sufficiently close to be pointed at), based on data obtained from features database 250. The scanning procedure is initiated by touch or voice commands issued when the user wants to start the scanning, or simply by self-detecting that UPI device 100 is held at an approximated horizontal position and then moved in an approximated horizontal arc. Moreover, as UPI device 100 is fully aware of its location, UPI device 100 can also be configured to alert the user about a change in the surroundings, such as rounding a corner, to promote the user to initiate a new scanning process.

A typical urban environment contains numerous objects of interest and a seeing person who is visually scanning the surroundings may instinctively notice specific objects of interest at suitable distances and of suitable distinctions to obtain the desired awareness of the surroundings. While it is difficult to fully mimic such intuitive selection by UPI device 100, several heuristic rules may be employed for an efficient and useful scanning procedure for the blind or visually impaired users. One rule can be that audio information should be provided primarily about objects that are in line-of-sight of UPI device 100 and that are relatively close. Another rule may limit the audio information to objects that are more prominent or more important in the surroundings, such as playing rich audio information about a building of commercial importance pointed at by UPI device 100, while avoiding playing information about other less significant buildings on a street. Yet another rule can be the control of the length and depth of the audio information based on the rate of motion of UPI device 100 along the approximated horizontal arc, such that the user may receive less or more audio information by a faster or slower horizontal motion of UPI device 100, respectively. Obviously, the parameters of these rules may be selected, set and adjusted by the user of UPI device 100. The audio information can be played by earbuds 210, loudspeaker 146 or the loudspeaker of handheld device 205, and can be accompanied by haptic outputs from vibration motor 144, or by visual outputs on screen 148 or on the screen of handheld device 205. The presentation of the audio information can be controlled by the motion of UPI device 100, by touch inputs on tactile sensors 132, or by voice commands captured by a microphone on earbuds 210, microphone 134 or the microphone of handheld device 205. For example, a short vibration may indicate that UPI device 100 points to an important object of interest and the user may be able to start the playing of audio information about that object by holding UPI device 100 steady, touching a sensor or speaking a command. Similarly, the user can skip or stop the playing of audio information by moving UPI device 100 further, touching another sensor or speaking another command.

FIG. 3 is a schematic flowchart of the scanning procedure performed by a blind or visually impaired person using UPI device 100. The actions taken by the user of UPI device 100 are on the left side of FIG. 3, in dashed frames, while the actions taken by UPI device 100 are on the right side of FIG. 3, in solid frames. In step 300, the user lifts UPI device 100 to horizontal position and issues a command to UPI 100 to start a scanning procedure. The issuing of the command may be explicit, such as by any of tactile sensors 132 or by a voice command, or may be implicit by holding UPI device 100 stable in a horizontal position, which may be recognized by UPI device 100 as the issuing of the scan command. UPI device 100 receives or identifies the scan command and estimates its exact location, azimuth and orientation in step 310. The exact estimation procedure was described in U.S. patent application Ser. No. 16/931,391 and it uses the initial location information obtained by GPS signals, the initial azimuth generated from measurements by magnetometer 124, the initial orientation generated from measurements by accelerometer 122 and a frontal visual representation generated by processing an image captured by camera 110, to identify a set of objects of interest 230 ("reference points") in the surroundings. The identification is performed by a comparison (using correlation) of the content of the frontal visual representation with the visual description of objects of interest 230 in the surroundings. Obviously, the initial location information is the key parameter that helps to narrow performing the comparison process only for objects of interest 230 that are in the surroundings, while not performing the comparison process for objects of interest 230 elsewhere. The initial azimuth and the initial orientation further assist in narrowing the performing the comparison process only for objects of interest 230 that are in a specific sector of the surroundings, while not performing the comparison process for objects of interest that are not in that sector. Once such set of objects of interest 230 is identified, the locations of these identified objects of interest 230 are obtained from database 250 and the exact location, azimuth and orientation of UPI device 100 is estimated using triangulation of the obtained locations of these identified objects of interest 230. In step 320 UPI device 100 identifies further objects of interest 230 in the surroundings as further objects of interest 230 that are pointed at pointing ray 105, i.e., objects of interest 230 that are in line-of-sight and that pointing ray 105 passes within a predetermined distance to them. Note that the further identified objects of interest 230 may be different than the set of objects of interest 230 ("reference points") that were identified for the estimation of the exact location, azimuth and orientation of UPI device 100 in step 310. UPI device 100 then provides information about the further identified objects of interest 230 to the user in step 330. As the user moves UPI device 100 in horizontal direction to scan the surroundings in step 340, UPI device 100 continuously further estimates its location, azimuth and orientation and repeats steps 320 and 330.

The following three examples demonstrate some superior aspects of scanning the surroundings by UPI device 100 over visual scanning of the surroundings by a seeing person. In the first example, UPI device 100 may also provide audio information about objects of significant importance in the surroundings, such as a mall, a landmark, a transportation hub or a house of warship, that might be very close but not in the direct line-of-sight of UPI device 100 (e.g., just around a corner). In the second example, the audio information about the pointed-at objects of interest 230 may include details that are not visible to a seeing person, such as lists of shops and offices inside a commercial building, or operating hours of a bank. In the third example it is assumed that UPI device 100 is pointed to a fixed alphanumeric information in the surroundings (such as street signs, stores and building names, informative or commemoration plaques, etc.). As the locations and the contents of most alphanumeric information in the public domain are likely to be tabulated in and available from features database 250, the alphanumeric information may be retrieve from features database 250, converted to an audio format and provided to the user of UPI device 100 regardless of the distance, the lighting or the viewing-angle of the alphanumeric information.

A seeing person may intuitively locate a specific target in the surroundings, such as an ATM, a store or a bus stop. Blind or visually impaired users of UPI device 100 are able to initiate a locating procedure for particular targets, such as "nearest ATM", using a touch or voice-activated app on handheld device 205, or, alternatively, by a touch combination of tactile sensors 132 on UPI device 100. The app or UPI device 100 may then provide the blind or visually impaired user with information about the target, such as the distance to and the general direction of the target, or any other information about the target such as operating hours if the target is a store, an office or a restaurant. If the user of UPI device 100 is only interested in reaching that specific target, the next step is to activate a navigating procedure, which is described further below, and to start walking toward the target. It is possible, however, that the user of UPI device 100 may want to know the general direction of a specific target or the general directions of several targets to be able to choose between different targets. To get an indication of the general direction of a specific target the user may lift UPI device 100 and point it to any direction, which will allow UPI device 100 to obtain current and accurate estimates of its location, azimuth and orientation. Once these estimates are obtained, UPI device 100 may use several method to instruct the user to manipulate the pointing direction of UPI device 100 toward the target, such as using audio prompts as "quarter circle to your left and slightly upward", playing varying tones to indicate closeness or deviation from the desired direction, or using vibration patterns to indicate closeness or deviation from the desired direction.

FIG. 4 is a schematic flowchart of the locating procedure performed by a blind or visually impaired person using UPI device 100. The actions taken by the user of UPI device 100 are on the left side of FIG. 4, in dashed frames, while the actions taken by UPI device 100 are on the right side of FIG. 4, in solid frames. In step 400, the user provides the target information, such as "City Museum of Art" or "nearest ATM". In step 410, UPI device 100 finds the target information in features database 250 of objects of interest 230. Note that UPI device 100 always has the general information about its location, using its GPS device 128 or the GPS data of handheld device 200, which allows it to find distances relative to its location, such as the nearest ATM. As the target information is found, in step 420 the user lifts UPI device 100 to horizontal position. In step 430 UPI device 100 estimates its exact location, azimuth and orientation, as described above in the discussion of FIG. 3. Once the exact location, azimuth and orientation of UPI device 100 are estimated, in step 440 UPI device 100 provides motion instructions to the user on how to move UPI device 100 such that UPI device 100 is pointing closer and closer to the direction of the target. In step 450 the user moves UPI device 100 according to the instructions. UPI device 100 then repeats the estimates its exact location, azimuth and orientation and provides further motion instructions to the user in steps 430 and 440, respectively. Obviously, when UPI 100 points directly to the target, UPI device 100 informs the user of the successful completion of the locating procedure.

Targets may be stationary targets, but can also be moving targets that their locations are known, such as vehicles that make their locations available (e.g., buses, taxies or pay-ride vehicles) or people that carry handheld devices and that consensually make their locations known. For example, a seeing person may order a pay-ride vehicle using an app and will follow the vehicle location on the app's map until the vehicle is close enough to be seen, where at that point the seeing person will try to visually locate and identify the vehicle (as the make, color and license plate information of pay-ride vehicles are usually provided by the app). As the vehicle is recognized and is approaching, the seeing person may raise a hand to signal to the driver and might move closer to the edge of the road. A blind or visually impaired person may be able to order a pay-ride vehicle by voice activating a reservation app and may be provided with audio information about the progress of the vehicle, but will not be able to visually identify the approaching vehicle. However, using UPI deice 100, as the location of UPI device 100 is known exactly and as the location of the pay-ride vehicle is known to the app, once the vehicle is sufficiently close to be seen, UPI device 100 may prompt the user to point it in the direction of the approaching vehicle such that an image of the approaching vehicle is captured by camera 110. The image of the approaching vehicle may then be analyzed to identify the vehicle and audio information (such as tones) may be used to help the user in pointing UPI device 100 at the approaching vehicle, such that updated and accurate information about the approaching vehicle may be provided to the user of UPI device 100. Obviously, the same identifying and information providing may be used for buses, trams, trains and any other vehicle with a known position. In yet another example, a seeing person may be able to visually spot a friend at some distance on the street and to approach that friend, which is impossible or difficult for a blind or visually impaired person. However, assuming that friends of a blind or visually impaired person allow their locations to be known using a special app, once such a friend is sufficiently close to the user of UPI device 100, the user of UPI device 100 may be informed about the nearby friend and the user may be further assisted in aiming UPI device 100 in the general direction of that friend.

UPI device 100 can also operate as a navigation device to guide a blind or visually impaired user in a safe and efficient walking path from a starting point to a destination point. Walking navigation to a destination is an intuitive task for a seeing person, by seeing and choosing the destination target, deciding on a path to the destination and walking to the destination while avoiding obstacles and hazards on the way. Common navigation apps in handheld devices may assist a seeing person in identifying a walking destination that is further and not in line-of-sight, by plotting a path to that destination and by providing path instructions as the person walks, where a seeing person is able to repeatedly and easily compensate and correct the common but slight errors in the navigation instructions. Assisted navigation for blind or visually impaired users of UPI device 100 is a complex procedure of consecutive steps that need to be executed to allow accurate and safe navigation from the location of the user to the destination. This procedure differs from the navigation by a seeing person who is helped by a common navigation app on a handheld device. Unlike the very general walking directions provided by a common navigation app, assisted navigation for the blind or visually impaired needs to establish a safe and optimal walking path tailored to the needs of the blind or visually impaired, and to provide precise guidance through the established walking path, while detecting and navigating around obstacles and hazards.

The navigating procedure starts with the choice of a walking destination using a navigation app, which may be performed by a blind or visually impaired person using voice commands or touch commands, as described above for the locating procedure. Once the walking destination and its location are established, the location of the user needs to be determined. An approximated location of the user may be obtained using GPS signals, but a more accurate location can be established by pointing UPI device 100 to any direction in the surroundings to obtain an estimation of the location by visual triangulations. (As some pointing directions may provide more reference points for more accurate visual triangulation, UPI device 100 may use voice prompts, tones or vibrations to instruct the user to point toward an optimal direction for improved estimation of the user location.) UPI device 100 may then inform the user about the accuracy of the estimation such that the user is aware of the expected accuracy of the navigation instructions. Once a sufficiently accurate (or best available) estimation of the user location is obtained, a navigation route from the user location to the location of the walking destination is planned and calculated. A specific route for blind or visually impaired users should avoid or minimize obstacles and hazards on the route, such as avoiding steps, construction areas or narrow passages, or minimizing the number of street crossings. The specific route should steer the user of UPI device 100 away from fixed obstacles, such as lampposts, street benches or trees, where the data about such fixed obstacles may be obtained from features database 250. Further, current visual data from CCTV cameras may show temporary obstacles, such as tables placed outside of a restaurant, water puddles after the rain or a gathering of people, and that visual data may be used to steer the user of UPI device 100 away from these temporary obstacles. In addition to considering the safety and the comfort of the blind or visually impaired user of UPI device 100, the route planning may also take into account the number and the density of reference points for visual triangulations along the planned walking route, such that the estimation of the user location and direction can be performed with sufficient accuracy throughout the walking route.

A seeing person may simply walk along the navigation route and use visual cues for directional orientation and for following the route, which is not possible for a blind or visually impaired person. Instead, the pointed structure UPI device 100 (e.g., its elongated body) may be used to indicate the walking direction for the blind or visually impaired users of UPI device 100. To start the walk, the user may hold UPI device 100 horizontally at any initial direction and UPI device 100 will then provide voice prompts, varying tones or vibrating patterns to guide the user in pointing UPI device 100 to the correct walking direction, as described above for the locating procedure. As the user walks, voice prompts, varying tones or vibrating patterns (or combination of these) may be continuously used to provide walking instructions, warnings of hazards and turns, guiding the correct position of UPI device 100, or providing any other information that makes the navigation easier and safer. UPI device 100 can use the data in features database 250 to safely navigate the user around fixed obstacles, but it may also use the information from camera 110 or LIDAR+ 115 to detect temporary obstacles, such as a trash bin left on the sidewalk or a person standing on the sidewalk, and to steer the user of UPI device 100 around these obstacles.

FIG. 5 is a schematic flowchart of the navigating procedure performed by a blind person using UPI device 100. The actions taken by the user of UPI device 100 are on the left side of FIG. 5, in dashed frames, while the actions taken by UPI device 100 are on the right side of FIG. 5, in solid frames. In step 500, the user specifies the walking destination, such as "Main Mall" or "nearest Italian restaurant". In step 510, UPI device 100 finds the walking destination information in database 250. As the walking destination information is found, at step 520 the user lifts UPI device 100 to horizontal position. At step 530 UPI device 100 estimates its exact location, azimuth and orientation (as described above in the discussion of FIG. 3), and calculates or refines a walking route from the location of the user of UPI device 100 to the walking destination. Once the exact location, azimuth and orientation of UPI device 100 are estimated and the walking route is calculated or refined, UPI device 100 provides motion instructions to the user on how to move UPI device such that UPI device 100 will point closer and closer toward the walking direction in step 540. As the user moves UPI device 100 according to the instructions in step 550, UPI device 100 repeats the estimates of its location, azimuth and orientation and providing further motion instructions to the user in steps 530 and 540, respectively. Once UPI device 100 points directly to the walking direction, it can inform the user that it is now pointing to the correct walking direction. As UPI device 100 now points to the correct walking direction, at step 560 UPI device 100 provides the user with walking instructions, such as "walk forward meters", which the user performs in step 570. As the user walks, UPI device 100 repeats the estimates its location, azimuth and orientation and the refinement of the walking route in step 530 and, as needed, steps 540, 550, 560 and 570 are repeated.

Scene analysis is an advanced technology of detecting and identifying objects in the surroundings and is already employed in commercial visual substitution products for the blind or visually impaired. Scene analysis algorithms use images from a forward-facing camera (usually attached to eyeglasses frames or head-mounted) and provide information describing the characteristics of the scene captured by the camera. For example, scene analysis may be able to identify whether an object in front of the camera is a lamppost, a bench or a person, or whether the path forward is smoothly paved, rough gravel or a flooded sidewalk. Scene analysis employs features extraction and probability-based comparison analysis, which is mostly based on machine learning from examples (also called artificial intelligence). Unfortunately, scene analysis algorithms are still prone to significant errors and therefore the accuracy of scene analysis may greatly benefit from the precise knowledge of the camera location coordinates and the camera angle. Using the camera location and angle may allow a more precise usage of the visual information captured by the camera in the scene analysis algorithms. In one example, fixed objects in the surroundings can be analyzed or identified beforehand, such that their descriptions and functionalities are stored in features database 250, which may save computation from the scene analysis algorithms or increase the probability of correct analysis of other objects. In another example of identifying whether an object in front of the camera is a lamppost, a bench or a person, a scene analysis algorithm may use the known exact locations of the lamppost and the bench in order to improve the identification that a person is leaning on the lamppost or is sitting on the bench. In yet another example, if it is known that camera 110 of UPI device 100 is pointing toward the location of sidewalk water drain, the probability of correctly detecting a water puddle accumulated during a recent rain may be greatly improved, such that the navigation software may steer the blind or visually impaired user away from that water puddle. Moreover, using the pre-captured visual and geographical information in features database 250, possibly with the multiple current images captured by camera 110 of the walking path in front of the user as the user walks forward, a 3D model of the walking path may be generated and the user may be steered away from uneven path or from small fixed or temporary obstacles on the path.

An interesting and detailed example of combining information from several sources is the crossing of a street at a zebra-crossing with pedestrian traffic lights. Using the accurate location estimation, UPI device 100 may lead the blind or visually impaired user toward the crossing and will notify the user about the crossing ahead. Moreover, the instruction from UPI device 100 may further include details about the crossing structure, such as the width of the road at the crossing, the expected red and green periods of the crossing traffic light, the traffic situation and directions, or even the height of the step from the sidewalk to the road. Pedestrian traffic lights may be equipped with sound assistance for the blind or visually impaired, but regardless of whether such equipment is used, UPI device 100 may direct the user to point it toward the pedestrian crossing traffic lights and may be configured to identify whether the lights are red or green and to notify the user about the identified color. Alternatively, the color of the traffic lights may be transmitted to UPI device 100. Once the crossing traffic lights change from red to green, UPI device 100 may inform the user about the lights change and the user may then point UPI device 100 toward the direction car traffic approaches the crossing. The image captured by camera 110 and the measurements by LIDAR+ 115 may then be analyzed to detect whether cars are stopped at the crossing, no cars are approaching the crossing or safely decelerating cars are approaching the crossing, such that it is safe for the user to start walking into the crossing. On the other hand, if that analysis detects that a car is moving unsafely toward the crossing, the user will be warned not to walk into the crossing. Traffic information may also be transmitted to and utilized by UPI device 100 from CCTV cameras that are commonly installed in many major street junctions. As the user crosses the road, UPI device 100 may inform the user about the progress, such as the distance or the time left to complete the crossing of the junction. In a two-ways road, once the user reaches the center of the junction, UPI device 100 may indicate the user to point it to the other direction to be able to analyze the car traffic arriving from that direction. As the user reaches the end of the crossing, UPI device 100 may indicate the completion of the crossing and may provide the user with additional information, such as the height of the step from the road to the sidewalk.

The usage of camera 110 was described above in visual triangulations to obtain exact estimations of the location, azimuth and ordination of UPI device 100 and in scene analysis to better identified and avoid obstacles and hazards and to provide richer information about the surroundings. Further, similar to currently available products for the blind or visually impaired that include forward-looking camera, camera 110 may also be used to allow the blind or visually impaired users of UPI device 100 to share an image or a video with a seeing person (e.g., a friend or a service person) who can provide help to the users of UPI device 100 by explaining an unexpected issue, such as roadblocks, constructions or people gathering. Moreover, in addition to the image or the video, UPI device 100 may also provide the seeing person with its exact location and the direction it points to, which can be used by the seeing person to get a much better understanding of the unexpected issue by using additional resources, such as emergency service resources or viewing CCTV feeds from the exact surroundings of the user of UPI device 100.

Several operation methods were described above in using UPI device 100 for visual substitution for the blind or visually impaired. It was shown that the unique information gathering and connectivity of UPI device 100 may be able to provide the blind or visually impaired with information that is not available for a seeing person, such as operating hours of businesses, reading of signs without the need to be in front of the signs, or noticing a nearby friend. Obviously, seeing people may also benefit for these features of UPI device 100. Moreover, several other functions may be performed by UPI device 100 for the benefit of seeing people. Most interestingly, UPI device 100 may be used as an optical stylus, as discussed extensively in U.S. patent application Ser. No. 16/931,391. In another example, the image or video captured by camera 110 may be displayed on the screen of handheld device 205 and used for inspecting narrow spaces or to capture a selfie image. Further, video calls using the front-facing camera of handheld device 205 (or a webcam of a laptop computer) are extensively used for personal and business communications, as well as for remote learning. During such video calls it is common to want to show an object that is outside the field view of the camera used for the call, such as drawings on a book page or on a whiteboard, or a completed handwritten mathematical exercise. In such cases, instead of bothering to move the object to the field view of the camera used for the video call (e.g. the camera of handled device 205), the user of UPI device 100 can simply aim camera 110 of UPI device 100 toward the object, such that camera 110 may capture an image or video feed of that object, which can then be sent to the other side of the video call. The video feed from camera 110 can replace the video feed from the front-facing camera of handheld device 205 (or the video feed from a webcam of a laptop computer) or both video feeds may be combined using a common picture-in-picture approach.

FIG. 6 provides examples of display screens that are used for interaction with computerized equipment, such as computer screen 610, TV screen 620, touchscreen in handheld device 630 (which might be the same as handheld device 205 or a different handheld device) or presentation screen 640 in a classroom or a lecture hall. Such screens are used to display information that is generated by the computerized equipment for the users, but are also used as tools for entering user input with keyboards or with common pointing elements such as mouse, remote control, fingers or stylus. UPI device 100 may be used for pointing at such screens, identifying a pointed at screen and activating the identified screen, in a method that is particular to screens, but is comparable to the method of pointing, identifying and activating objects of interest presented in FIGS. 3 and 6 and discussed above. A first difference is that each screen renders visual information generated by the computerized equipment, which means that as UPI device 100 points at a screen, the at least one image captured by camera 110 contains not only the outline of that screen, but also the visual information rendered on that screen. A representation of the content rendered on the screens (which we call "screen content data") may be transmitted from the computerized equipment to handheld device 205 or UPI device 100. In addition, visual descriptions of outlines of screens may be obtained from private or public features database 250. Therefore, visual descriptions of screens may be generated using at least one of the screens content data and the obtained visual descriptions of outlines of screens. The generated visual descriptions of screens may be used for the identification of a particular screen, similar to using stored visual descriptions of objects of interest from public or private features databases for the identification of a particular object of interest, as described in details by U.S. patent application Ser. No. 16/931,391. A second difference is that the activating of the identified screen by UPI device 100 may be a continuous process of activating and modifying the content displayed on the screen in the same way that common pointing elements are used for activation and control of display screens.

FIG. 7 is a schematic flowchart of an operation method of UPI device 100 in pointing at display screens, identifying a pointed at screen and activating the identified screen based on the relative position between UPI device 100 and the identified screen and based on user 200 input on UPI device 100. This operation method was described in detail by U.S. patent application Ser. No. 16/931,391. The identification of a screen may be considered as identifying a particular screen from candidates' screens, but it can also be considered as confirming that UPI device 100 is properly positioned and points to a particular screen, ready to activate that screen. Steps 710-740 in FIG. 7 are parallel to steps 310-340 in FIG. 3 of U.S. patent application Ser. No. 16/931,391, where the only difference is that in step 740 the transmitting of the estimated orientation of UPI device 100, the estimated azimuth of UPI device 100 and the generated frontal visual representation for UPI device 100 by communication component 154 from UPI device 100 to handheld device 205 is for the identification of a screen pointed at by UPI device 100. Step 750 describes obtaining features of candidates' screens from features database 250, wherein the features of candidates screens comprise of at least one of the location parameters of candidates' screens and the visual descriptions of outlines of candidates screens, receiving screen content data of candidates' screens from computerized equipment, generating visual descriptions of candidates' screens based on at least one of the visual descriptions of outlines of candidates' screens and the screen content data of candidates' screens, followed by identifying the screen pointed at by UPI device 100 based on the estimated orientation of UPI device 100, on the estimated azimuth of UPI device 100, on the generated frontal visual representation for UPI device 100 and on at least one of the obtained location parameters of candidates' screens and the generate visual descriptions of candidates' screens, as described in the discussion of FIG. 4 of U.S. patent application Ser. No. 16/931,391. It should be emphasized that the use of the term "obtaining features from features database 250" should be viewed as a general step of obtaining all necessary data about the locations, the orientations, the physical dimensions, the outlines and the content of the candidates' screens. For example, the locations and orientation of fixed screens (e.g., TV screen 620 or presentation screen 640) may be known and stored in features database 250, while the locations and orientations of handheld devises may be constantly calculated and updated, employing the same approach described for UPI device 100 and utilizing the images captured by the rear-facing cameras of the handheld devices. Note, of course, that this approach for calculating and updating the locations and orientations of handheld devises is described in several of the references cited in U.S. patent application Ser. No. 16/931,391. Moreover, as discussed for some objects of interest in FIG. 7 of U.S. patent application Ser. No. 16/931,391, as practically all computerized equipment incorporates wireless communication elements, directional and strength measurements of wireless signals may be used in the identification process. For example, assuming that a particular UPI device 100 can be used interchangeably with several different handheld phones, using measurements of the WiFi signals strength (or the strength of any other wireless signals) from these different phones may be used to assist in the determination of which of the different handheld phones with its screen is pointed at by that UPI device 100. In addition, if a particular UPI device 100 is used entirely with a particular screen, for example, the single handheld device used the user of that UPI device 100 with its screen, the process of identifying the screen described above may be completely bypassed and eliminated.

Once a screen is identified, user 200 may further use UPI device 100 to activate the identified screen. The key to activating the identified screen is the estimation of the relative spatial relations between UPI device 100 and the screen, and in particular the relative spatial relations between UPI device 100 and a handheld device with a screen. Using the relative spatial relations between UPI device 100 and the screen it is possible to estimate the screen coordinates at the location pointed at by tip 102 of UPI device 100, which are the coordinates relative to one corner of the screen where the extension of the main axis of UPI device 100 in the frontal direction from tip 102 of UPI device 100, represented by pointing ray 105, meets the identified screen. The estimating of the relative spatial relations between UPI device 100 and the screen, as well as the estimation of the screen coordinates at the location pointed at by tip 102 of UPI device 100, may use the estimated orientation and azimuth of UPI device 100 and the known or the estimated orientation and azimuth of the identified screen. The estimation may also use the information about the obtained visual descriptions of outline of the identified screen and the content of the identified screen for match filtering with the image captured by camera 110 of between UPI device 100 for match filtering to establish the exact spatial relations between UPI device 100 and the identified screen. It is important to note that the estimated orientation and azimuth of UPI device 100 and the known or the estimated orientation and azimuth of the identified screen may be used to generate modified visual descriptions of outline of the identified screen and the content of the identified screen, using spatial translation, rotation and perspective projection of the obtained visual descriptions of outline of the identified screen and the content of the identified screen, to compensate for the resulted spatial shift, angle and perspective due to the relative locations and angles between UPI device 100 and the identified screen. Moreover, if the screen is a handheld device, such as a smartphone or tablet, it is possible to use images captured by either the front-facing camera or the back-facing camera of the handheld device to generate visual representations that include the outline of UPI device 100 and to use these visual representations for the estimating of the relative spatial relations between UPI device 100 and the handheld device and its screen, as well as the estimation of the screen coordinates at the location pointed at by tip 102 of UPI device 100. In addition, LIDAR 115, as well as the equivalent components on the handheld device or other screen, may be used for the estimating of the relative spatial relations between UPI device 100 and the screen, as well as the estimation of the screen coordinates at the location pointed at by tip 102 of UPI device 100.

The identified screen may be activated by user 200 of UPI device 100, such as selecting items on the identified screen, opening a hyperlink, scrolling, zooming, highlighting or any other activation commonly performed by a mouse or other common pointing element, based on the estimated screen coordinates at the location pointed at by tip 102 of UPI device 100 and based on activating signals from UPI device 100 provided by at least one of accelerometer 122, magnetometer 124, camera 110, gyroscope 126, tactile sensors 132, microphone 134 and fingerprint detection sensor 136, as described in step 760. In particular, the 2-dimensional activations based on the screen coordinates at the location pointed at by tip 102 of UPI device 100, which is similar to activation by a mouse or other common pointing elements, may be extended to 3-dimensional activations. It is possible to trace the relative 3-dimensional motion between UPI device 100 and the identified screen and to activate the identified screen based on that 3-dimensional motion, such as zooming in and out based on the changing distance between UPI device 100 and the identified screen, which may be detected by any of user location sensing components 120, camera 110 and LIDAR 115, as well as the equivalent components on the selected screen, such as the location/motion sensing components, the front-facing camera, the rear-facing camera and LIDAR sensors of the selected screen.

The interaction of UPI device 100 with the screen of handheld device 830 (which may play the role of handheld device 205) is of particular interest, as handheld device 830 may not be stationary and therefore the screen coordinates for the screen of handheld device 830 at the location pointed at by tip 102 of UPI device 100 may also depend on the motion of handheld device 830. One aspect is that the relative 3-dimensional motion between UPI device 100 and handheld device 830 may be further tracked by the motion sensors of handheld device 830. Another aspect is that since handheld device 830 includes a front-facing camera and a rear-facing camera, for handheld device 830 the estimation of the screen coordinates at the location pointed at by tip 102 of UPI device 100 and the activation of the screen may also be based on at least one image taken by at least one of the front-facing camera and the rear-facing camera of handheld device 830. When UPI device 100 points to the screen of handheld device 830, image of UPI device 100 may be captured by the front-facing camera, whereas when UPI device 100 points to identified objects of interest in the field of view of the rear-facing camera (depicted by FIG. 8 and discussed below), image of UPI device 100 may be captured by the rear-facing camera. An image of UPI device 100 captured by any of the front-facing camera and the rear-facing camera may be used to further assist in step 760 in the estimation of the screen coordinates for the screen of handheld device 830 at the location pointed at by tip 102 of UPI device 100. An image of UPI device 100 captured by any of the front-facing camera and the rear-facing camera may also be used in the estimation of the relative positions of UPI device 100 and handheld device 830 even if the tip 102 of UPI device 100 is not pointing at the screen of handheld device 830. Moreover, particular shapes and color marking on UPI device 100 may further improve the accuracy and efficiency of the estimation of the relative position between UPI device 100 and handheld device 830, using images captured by any camera on handheld device 830. In addition, measurements by LIDAR 115 or by a LIDAR of handheld device 830 of the distance between UPI device 100 and handheld device 830 may be used in tracking the relative position of UPI device 100 with respect to handheld device 830. Moreover, a multi-beams LIDAR of handheld device 830 may be used to provide very accurate estimation of the relative spatial relations between UPI device 100 and handheld device 830 and its screen, as well as the estimation of the screen coordinates at the location pointed at by tip 102 of UPI device 100.

Handheld device 830 and UPI device 100 may be configured to provide augmented reality (AR) window into the environment, providing orientation and entertainment to user 200. Since handheld device 830 includes a rear-facing camera, UPI device 100 may be used to point at objects viewed on the screen of handheld device 830 that are either captured by the rear-facing camera or are virtually generated on the screen of handheld device 830 as augmented reality objects in the environment captured by the rear-facing camera. FIG. 8 shows several examples of UPI device 100 interacting with real and virtual objects that are displayed on the screen of handheld device 830. The first example is of pointing at real objects of interest in the environment such as building 826 and at public transportation vehicle 822. As discussed in U.S. patent application Ser. No. 16/931,391, using location information using GPS or other positioning systems and improving the accuracy of the location and directional information, the pointing at building 826 may provide user 200 with information such as businesses and residences in building 826, and the pointing at transportation vehicle 822 may provide information such as schedule and destinations of transportation vehicle 822. Using UPI device 100, it is possible to generate markers that point or interact with the images of the real objects of interest. In this first example, the images of these real objects of interest are captured by the rear-facing camera and are displayed on the screen of handheld device 830. As user 200 points to these real objects of interest, interacting marker 810 extends pointing ray 105 on the screen of handheld device 830. For the element of building 826, UPI device 100 is above the plane of the screen and interacting marker 810 starts on the screen at the point where pointing ray 105 "reaches" the screen of handheld device 830 and ends near the image of building 826 on the screen. For public transportation vehicle 822, UPI device 100 is below the plane of the screen and therefore its image (part or whole) may be captured by the rear-facing camera of handheld device 830. In this example, interacting marker 810 starts on the screen at the image of tip 102 of UPI device 100 and ends near the image of public transportation vehicle 822 on the screen. A second example is of augmented reality games that may place virtual objects 820 overlaid in the environment in the content of the image or video captured by the rear-facing camera of handheld device 830. As the locations on the screen of handheld device 830 of such of the game virtual object are determined by the game design and are known, UPI device 100 may be used to point to the screen of handheld device 830 and interact, using interacting content, with virtual objects 820 via the screen of handheld device 830. In particular, interaction graphic content may be generated on the screen of handheld device 830 for the interacting with virtual objects 820, such as a lightning bolt to fight an evil wizard, a ballistic path to throw a ball to hit a magical creature, or a lasso to catch a flying dragon. The interacting with real objects of interest in the environment and with virtual objects generated for games may be also carried out by providing output by UPI device 100 with its LED, its vibration motor, its loudspeaker or its optional screen, as well as providing output by handheld device 830 with its loudspeaker or its vibration motor.

The invention claimed is:

1. A method of activating a screen of a handheld device by a universal pointing and interacting (UPI) device, the method comprises:
    capturing at least one image by a camera of the UPI device positioned at a tip of the UPI device facing a frontal direction of a main axis of the UPI device, wherein the tip of the UPI device is a frontal end of the longest dimension of an elongated body of the UPI device and the main axis is the axis of the longest dimension of the elongated body of the UPI device;
    processing by a computation component of the UPI device the at least one captured image to generate a frontal visual representation for the UPI device;
    transmitting by a communication component the generated frontal visual representation for the UPI device from the UPI device to the handheld device;
    capturing at least one of a front-facing image by a front-facing camera of the handheld device and a back-facing image by a back-facing camera of the handheld device;
    processing by the handheld device the at least one of the front-facing image and the back-facing image to generate at least one of a front-facing visual representation and a back-facing visual representation for the handheld device;
    estimating relative spatial relations between the UPI device and the handheld device, wherein the estimating is based on the transmitted frontal visual representation for the UPI device and the at least one of the front-facing visual representation and the back-facing visual representation for the handheld device;
    activating the screen of the handheld based on the estimated relative spatial relations between the UPI device and the handheld device and based on activating signals from the UPI device provided by at least one of an accelerometer of the UPI device, a magnetometer of the UPI device, the camera of the UPI device, a gyroscope of the UPI device, a tactile sensor of the UPI device, a microphone of the UPI device and a fingerprint detection sensor of the UPI device.

2. The method of claim 1, further comprising:
measuring acceleration parameters of the UPI device by the accelerometer of the UPI device;
processing the measured acceleration parameters of the UPI device to estimate an orientation of the UPI device;
wherein the estimating of the relative spatial relations between the UPI device and the handheld device is further based on the estimated orientation of the UPI device.

3. The method of claim 1, further comprising:
measuring magnetic field parameters of the UPI device by the magnetometer of the UPI device;
processing the measured magnetic field parameters of the UPI device to estimate an azimuth of the UPI device;
wherein the estimating of the relative spatial relations between the UPI device and the handheld device is further based the estimated the azimuth of the UPI device.

4. The method of claim 1, further comprising:
measuring acceleration parameters of the handheld device by an accelerometer of the handheld device;
processing the measured acceleration parameters of the handheld device to estimate an orientation of the handheld device;
wherein the estimating of the relative spatial relations between the UPI device and the handheld device is further based the estimated orientation of the handheld device.

5. The method of claim 1, further comprising:
measuring magnetic field parameters of the handheld device by a magnetometer of the handheld device;
processing the measured magnetic field parameters of the handheld device to estimate an azimuth of the handheld device;
wherein the estimating of the relative spatial relations between the UPI device and the handheld device is further based the estimated azimuth of the handheld device.

6. The method of claim 1, wherein the estimating of the relative spatial relations between the UPI device and the handheld device is further based on at least one of a LIDAR of the UPI device and a LIDAR of the handheld device.

7. The method of claim 1, further comprising:
estimating screen coordinates of the screen of the handheld device at a location pointed at by the tip of the UPI device based on the estimated relative spatial relations between the UPI device and the handheld device.

8. The method of claim 7, wherein the estimating screen coordinates of the screen of the handheld device at the location pointed at by the tip of the UPI device is further based on a content displayed on the screen of the handheld device.

9. The method of claim 8, wherein the estimating screen coordinates of the screen of the handheld device at the location pointed at by the tip of the UPI device is further based on at least one a spatially translation of the displayed content, a rotation of the displayed content and a perspective projection of the displayed content, and wherein the at least one of the spatial translation, the rotation and the perspective projection is based on the estimated relative spatial relations between the UPI device and the handheld device.

10. The method of claim 7, wherein the estimating screen coordinates of the screen of the handheld device at the location pointed at by the tip of the UPI device is further based on at least one of an outline of the UPI device and an outline of the handheld device.

11. The method of claim 7, wherein the activating of the screen of the handheld device is based on the screen coordinates of the screen of the handheld device at the location pointed at by the tip of the UPI device and wherein the activating of the screen of the handheld comprises of at least one of selecting an item from the displayed content on the screen of the handheld device, zooming in of the displayed content on the screen of the handheld device, zooming out of the displayed content on the screen of the handheld device, scrolling the displayed content on the screen of the handheld device and opening a hyperlink embedded in the displayed content on the screen of the handheld device.

12. The method of claim 1, further comprising:
estimating location parameters of the handheld device using at least one of GPS signals, cellular signals, Wi-Fi signals, Bluetooth signals and dedicated wireless beacons signals;
capturing the back-facing image by the back-facing camera of the handheld device;
processing by the handheld device the back-facing image to generate the back-facing representation for the handheld device;
measuring acceleration parameters of the handheld device by an accelerometer of the handheld device;
processing the measured acceleration parameters of the handheld device to estimate an orientation of the handheld device;
measuring magnetic field parameters of the handheld device by a magnetometer of the handheld device;
processing the measured magnetic field parameters of the handheld device to estimate an azimuth of the handheld device;
obtaining features of candidates' objects of interest from a features database;
identifying an object of interest based on the estimated orientation of the handheld device, on the estimated azimuth of the handheld device, on the back-facing representation for the handheld device, on the estimated location parameters of the handheld device and on the obtained features of candidates objects of interest;
generating content on the screen of the handheld device based on the identity of the object of interest and the estimated relative spatial relations between the UPI device and the handheld device.

13. The method of claim 12, wherein the obtaining features of candidates' objects of interest from a features database is based on the estimated location parameters of the handheld device.

14. The method of claim 12, further comprising:
providing output by an output component of the UPI device based on the identity of the object of interest and the estimated relative spatial relations between the UPI device and the handheld device, wherein the output component of the UPI device is at least one of an LED, a vibration motor, a loudspeaker and a screen.

15. The method of claim 12, further comprising:
providing output by the handheld device based on the identity of the object of interest, wherein the output is provided by at least one of playing audio using a loudspeaker on the handheld device and vibrating the handheld device using a vibration motor of the handheld device.

16. The method of claim 15, wherein the providing output by the handheld device is further based on based on estimated relative spatial relations between the UPI device and the handheld device.

17. The method of claim 1, further comprising:
estimating location parameters of the handheld device using at least one of GPS signals, cellular signals, Wi-Fi signals, Bluetooth signals and dedicated wireless beacons signals;
capturing the back-facing image by the back-facing camera of the handheld device;
processing by the handheld device the back-facing image to generate the back-facing representation for the handheld device;
measuring acceleration parameters of the handheld device by an accelerometer of the handheld device;
processing by the handheld device the measured acceleration parameters of the handheld device to estimate an orientation of the handheld device;
measuring magnetic field parameters of the handheld device by a magnetometer of the handheld device;
processing by the handheld device the measured magnetic field parameters of the handheld device to estimate an azimuth of the handheld device;
generating a virtual content on the screen of the handheld device based on at least one of the estimated location parameters of the handheld device, the generated back-facing representation for the handheld device, the orientation of the handheld device and the azimuth of the handheld device;
generating an interacting content on the screen of the handheld device based on the generated virtual content on the screen of the handheld device and the estimated relative spatial relations between the UPI device and the handheld device.

18. The method of claim 17, further comprising:
providing output by an output component of the UPI device based on at least one of the generated virtual content on the screen of the handheld device and the generated interacting content on the screen of the handheld device;
wherein the output is further based on the estimated relative spatial relations between the UPI device and the handheld device and wherein the output component of the UPI device is at least one of an LED, a vibration motor, a loudspeaker and a screen.

19. The method of claim 17, further comprising:
providing output by the handheld device based on at least one of the generated virtual content on the screen of the handheld device and the generated interacting content on the screen of the handheld device;
wherein the and output is further based on the estimated relative spatial relations between the UPI device and the handheld device and wherein the output is provided by at least one of playing audio using a loudspeaker on the handheld device and vibrating the handheld device using a vibration motor of the handheld device.

* * * * *